United States Patent

Arai

Patent Number: 5,465,156
Date of Patent: Nov. 7, 1995

[54] FACSIMILE MACHINE HAVING PRINTER UNIT AND INTERFACE

[75] Inventor: Yoshihiro Arai, Isehara, Japan

[73] Assignee: Ricoh Company, Ltd., Tokyo, Japan

[21] Appl. No.: 38,646

[22] Filed: Mar. 29, 1993

[30] Foreign Application Priority Data

Mar. 30, 1992 [JP] Japan .................................. 4-103540

[51] Int. Cl.$^6$ .................................. H04N 1/00; H04N 1/32
[52] U.S. Cl. .................................. 358/296; 358/442
[58] Field of Search .................................. 358/296, 400,
358/401, 442, 443, 444, 468; 395/110,
112, 115, 116, 118, 128, 150; 400/61, 70, 76

[56] References Cited

U.S. PATENT DOCUMENTS

| | | | |
|---|---|---|---|
| 4,652,933 | 3/1987 | Koshiishi | 358/442 X |
| 4,827,349 | 5/1989 | Ogata | 358/256 |
| 5,268,770 | 12/1993 | Yukino | 358/442 X |
| 5,383,030 | 1/1995 | Seo | 358/442 |
| 5,398,305 | 3/1995 | Yawata et al. | 395/115 X |

*Primary Examiner*—Peter S. Wong
*Assistant Examiner*—Eric Frahm
*Attorney, Agent, or Firm*—Oblon, Spivak, McClelland, Maier & Neustadt

[57] ABSTRACT

A facsimile machine includes a printer unit for printing out data having a predetermined format, and an interface circuit for converting facsimile image data into recording data having a format in which the printer unit can input the recording data and for supplying the recording data to the printer unit. The printer unit includes a printing portion for printing recording data, and a data supply control circuit for supplying the recording data from the interface circuit to the printing portion at predetermined printing intervals.

10 Claims, 13 Drawing Sheets

FACSIMILE MACHINE HAVING PRINTER UNIT AND INTERFACE

BACKGROUND OF THE INVENTION (1) Field of the invention

The present invention relates to a facsimile machine having a printer unit.

(2) Description of the related art

A general facsimile machine for sending and receiving image information is provided with an image recording unit, such as a thermal recording unit or a laser printing unit, to record received image information.

The thermal recording unit can be simply constituted at a low cost and can be miniaturized, so that the thermal recording unit is suitable for a low cost facsimile machine such as popularized or miniaturized type of facsimile machine. However, in a case where the thermal recording unit is provided in a facsimile machine, the quality of images formed on a thermal recording sheet easily deteriorates due to heat, friction, chemical interaction, oxidation, and the like. That is, there is a disadvantage in that the preservability of the thermal recording sheet used in the thermal recording unit is low.

It is possible that a printer unit coming into the market as a hard copying unit for obtaining hard copies in a general computer system such as a personal computer system is built in a facsimile machine. If the printer unit is built in a facsimile machine, a low cost facsimile machine having the high preservability of the recorded images can be provided. However, in this case, there are the following disadvantages.

A general printer unit is used for outputting figures and characters, and processes data having a structure different from that of data normally in a facsimile machine recording image information. Thus, even if a general printer unit is simply built in a facsimile machine, the general printer unit is not used for recording image information in the facsimile machine. In addition, the printer unit has an interface for effectively inputting figures and characters. Thus, figures and characters can be recorded with a high data transmission rate. However, graphic data cannot be recorded with the high data transmission rate and the amount of the graphic data to be transmitted in facsimile transmissions is generally huge, so that it takes a long time for printing graphic information for one page.

SUMMARY OF THE INVENTION

Accordingly, a general object of the present invention is to provide a novel and useful facsimile machine having a printer unit in which the disadvantages of the aforementioned prior art are eliminated, A more specific object of the present invention is to provide a facsimile machine having a printer unit by which facsimile image information can be effectively recorded.

The above objects of the present invention are achieved by a facsimile machine comprising: a printer unit for printing out data having a predetermined format; and interface means, coupled to the printer unit, for converting facsimile image data into recording data having a format such that the printer unit can input the recording data and for supplying the recording data to the printer unit, wherein the printer unit comprises: a printing portion for printing recording data; and data supply control means, coupled to the interface means and the printer portion, for supplying the recording data from the interface means to the printing portion at predetermined intervals.

According to the present invention, the facsimile image (including the graphic information) is converted into recording data having a format such that the recording data can be printed by the printer unit, and the recording data is supplied to the printing portion of the printer unit at the predetermined intervals. Thus, the facsimile image data can be effectively printed by the printer unit.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention.

Figure 1:
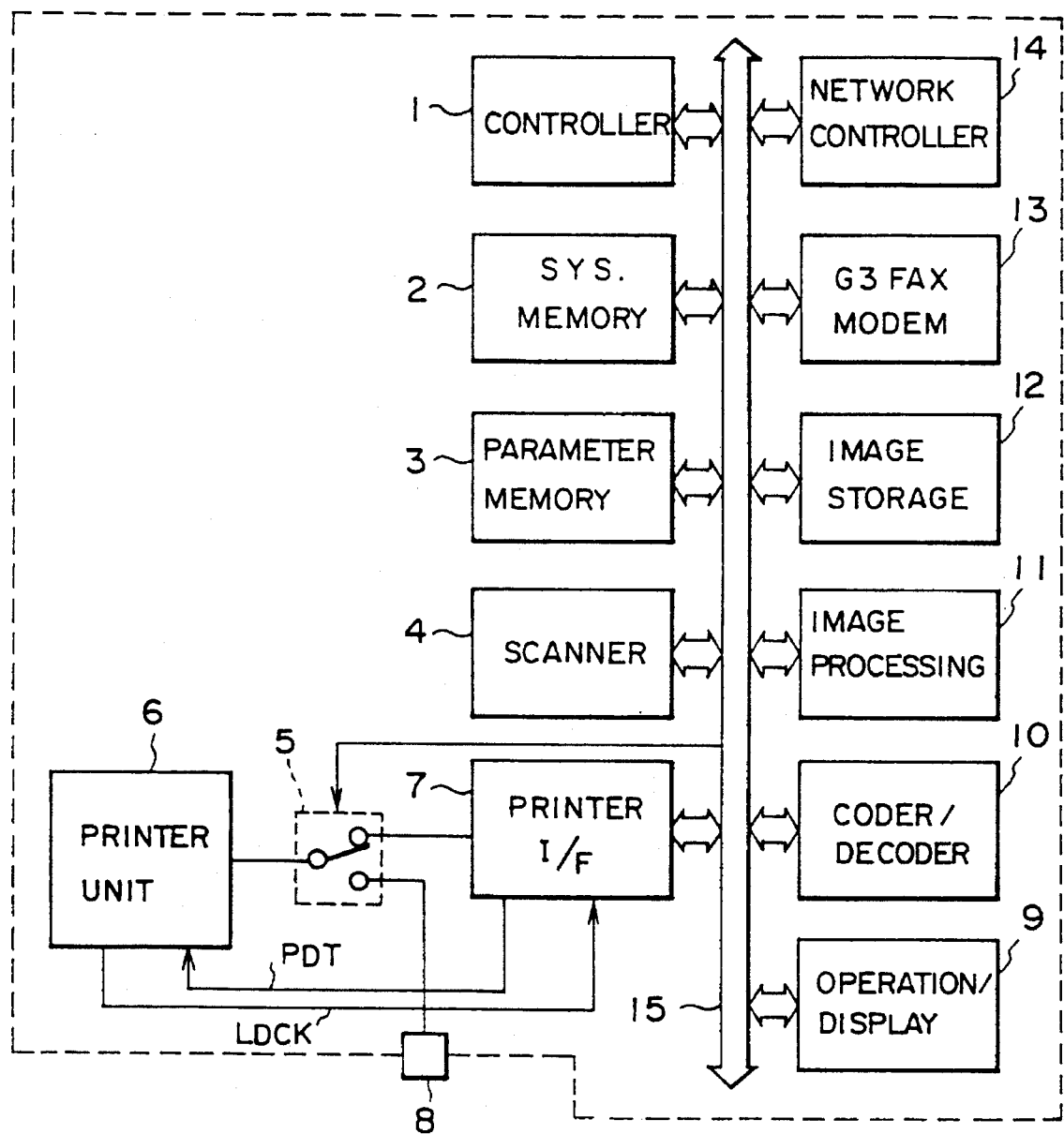
FIG. 1 is a block diagram illustrating a G3 facsimile machine according to an embodiment of the present invention.

FIG. 1 shows a G3 facsimile machine according to an embodiment of the present invention.

Referring to FIG. 1, a facsimile machine comprises a controller 1, a system memory 2, a parameter memory 3, a scanner 4, a printer interface circuit 7, an operation/display unit 9, a coder/decoder unit 10, an image processing unit 11, an image storage unit 12, a G3 facsimile modem 13 and a network control unit 14 all of which are coupled to each other by system bus 15. The facsimile machine also comprises a printer unit 6 coupled to the printer interface circuit 7 via a switching circuit 5. The controller 1 controls respective sections in the facsimile machine, carries out a printer interface control process for sending and receiving data to and from a printer unit 6, and carries out a facsimile transmission procedure process. The system memory 2 is used for storing control programs to be executed by the controller 1 and various data required for executing the control programs, and has an area used as a work area for the controller 1. The parameter memory 3 is used for storing various information depending on the performance capabilities of this G3 facsimile machine. The scanner 4 reads an original image at a predetermined resolution. The switching circuit 5 selectively connects an external terminal of the printer unit 6 to either the printer interface circuit 7 or an external connector 8. The printer unit 6 prints images at a predetermined resolution (e.g. 360 dots/inch) and is provided with a signal interface based on the so-called centronics interface specification. The printer unit 6 sends and receives data to and from an external unit via the signal interface. The printer interface circuit 7 has a function for connecting circuits to each other, which function is one of functions of the centronics interface. When data is recorded in the printer unit 6, the printer interface circuit 7 outputs recording data PDT which is 8-bit parallel data in synchronism with a load clock signal LDCK output from the printer unit 6. The operation/display unit 9 is provided with various operation keys to be operated by users and with a display panel for displaying various messages and other information.

The coder/decoder unit 10 codes an original image signal in accordance with a predetermined algorithm and decodes a coded image signal received by this facsimile machine into an original image signal. The image processing unit 11 carries out a resolution converting process for converting a resolution of an image signal obtained in the facsimile machine into a printing resolution appropriate for the printer unit 6. The image storage unit 12 is used for storing coded image information. The G3 facsimile modem 13 has a low speed type modem (a V.21 modem) and a high speed type modem (a V.29 modem, or a V.27ter modem) generally used for communicating image information. The network controller 14 connects this facsimile machine to the public telephone line and has an automatic call-out/call-in function. Data is directly transmitted between the network controller 14 and the G3 facsimile modem 13. The switching operation of the switch circuit 5 is controlled by the controller 1.

Figure 2:
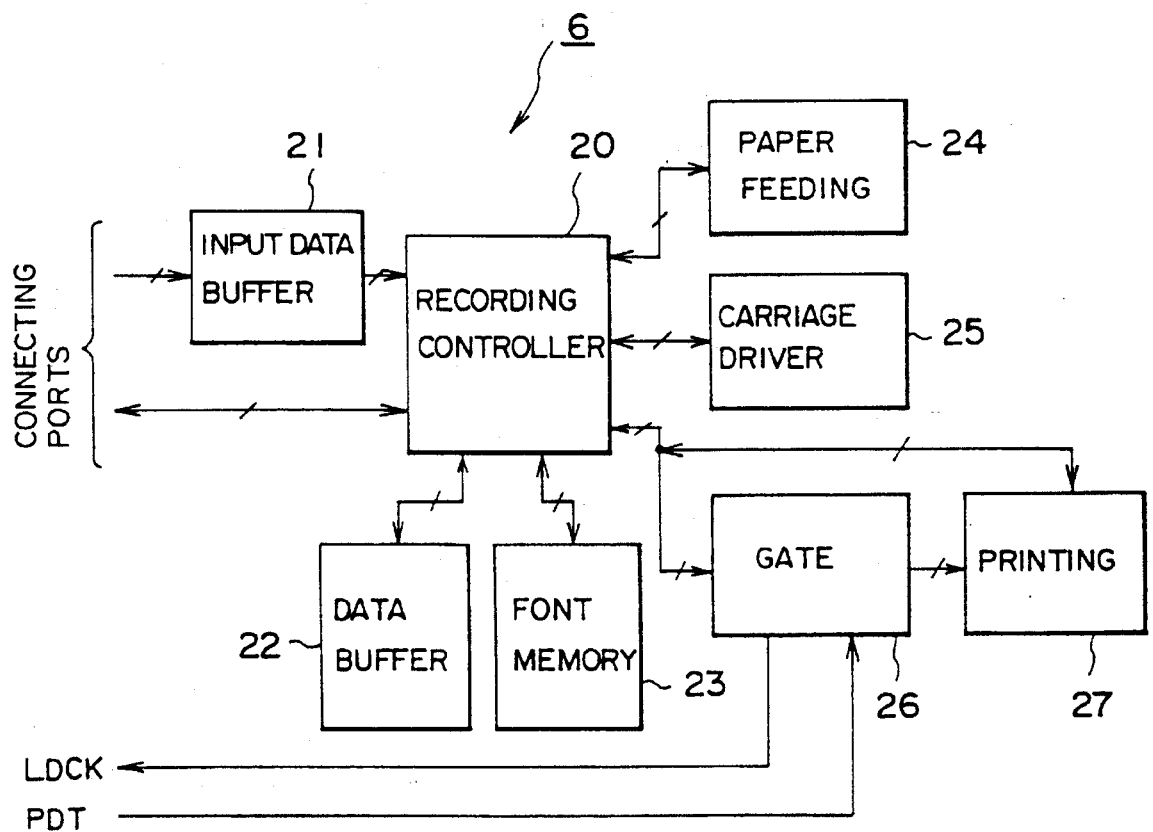
FIG. 2 is a block diagram illustrating a structure of a printer unit built in the facsimile machine shown in FIG. 1.

The printer unit 6 is essentially formed as shown in FIG. 2.

Referring to FIG. 2, the printer unit 6 comprises a recording controller 20, an input data buffer 21, an image data buffer 22, a font memory 23, a paper feeding mechanism 24, a carriage driver 25, a gate circuit 26, a printing portion 27. The recording controller 20 controls various sections in the printer unit 6 and carries out a signal interface control process for the centronics interface. The input data buffer 21 temporarily stores printing data (character code data) input from the external terminal and operates in accordance with a FIFO (first-in first-out) algorithm. The image data buffer 22 stores image data for one main scanning line. The font memory 23 stores font data for a character code set including predetermined character codes. The font data for each character code indicates a character image formed of a dot set. The paper feeding mechanism 24 feeds a recording sheet line by line in a sub scanning direction which is perpendicular to a direction in which a carriage moves. The carriage driver 25 causes the carriage to move within a predetermined range, the carriage having a printing head mounted thereon. The gate circuit 26 inputs the recording data PDT supplied from the printer interface circuit 7 and parallel image data supplied from the recording controller 20. In the gate circuit 26, each bit of the parallel printing data is gated based on a corresponding bit of the recording data PDT. The gate circuit 26 outputs the load clock signal LDCK in synchronism with the output operation of the parallel printing data.

The recording controller 20 reads out a character code stored in the input data buffer 21 and reads out from the font memory 23 font data corresponding to the read character code. The font data is mapped in the image data buffer memory 22 at an address corresponding to a position at which a corresponding character is to be printed. A process for mapping font data corresponding to a character code in the data buffer memory 22 is successively repeated until a return code is detected. The carriage is rapidly moved by the carriage driver 25 until the printing head is located at an initial printing position as designated by the external unit. After this, while the carriage is being moved at a printing mode speed lower than a speed at which the carriage is moved to the initial printing position, the image data is read out from the image data buffer 22 and the image data is converted into printing data based on which the printing head prints characters. The printing data is supplied to the printing portion 27. When the carriage has moved one line and the printing operation for one line has been completed, the paper feed mechanism 24 is driven so that the recording sheet is fed, in a direction (the sub scanning direction) in which printing lines are to be arranged, a distance corresponding to feeding length as designated by the external unit.

The above operation is repeated so that an image for one page is printed on the recording sheet. After the printing operation for one page is completed, the recording sheet on which the image has been printed is ejected from the printer unit 6. If there is image data for the next page, a recording sheet for the next page is fed to a recording position.

The printing operation may also be performed while the carriage is being returned. In this manner, the time required for printing the image for one page decreases.

Figure 3:
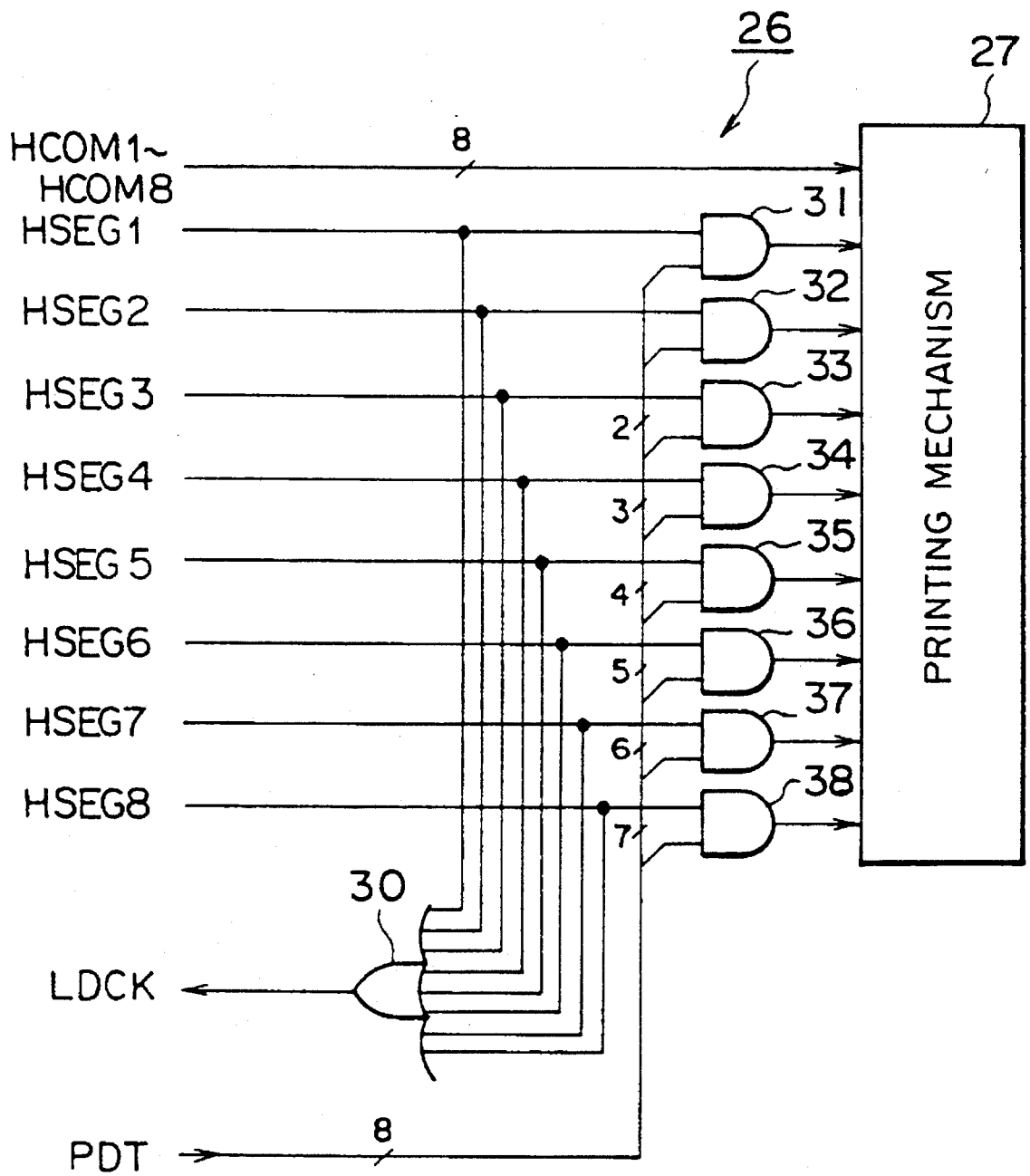
FIG. 3 is a circuit diagram illustrating a gate circuit provided in the printer unit shown in FIG. 2.

In this embodiment, the printing portion 27 has a printing width of 64 dots in the sub scanning direction, and the 64 dots are divided into eight blocks, each block having 8 dots. In this case, the gate circuit 26 is formed as shown in FIG. 3. The gate circuit 26 is supplied with the printing data including signals HCOM1–HCOM8 (negative logical signals), signals HSEG1–HSEG8, the load clock signal LDCK and the recording data PDT. The signals HCOM1–HCOM8 are used for selecting a block to be active from among eight blocks in the printing portion 27. The signals HSEG1–HSEG8 are used for designating a color (black or white) of each of the 8 dots in the selected block. A logical high level of each of the signals HSEG1–HSEG8 corresponds to a black dot, and a logical low level of each of the signals HSEG1–HSEG8 corresponds to a white dot. The signals HCOM1–HCOM8 are supplied to block selecting terminals of the printing portion 27. All the signals HSEG1–HSEG8 are supplied to input terminals of an OR gate 30. The signals HSEG1–HSEG8 are further respectively supplied to input terminals of AND gates 31, 32, 33, 34, 35, 36, 37 and 38. Other input terminals of the AND gates 31, 32, 33, 34, 35, 36, 37 and 38 are supplied with respective bits of the recording data PDT from the printer interface circuit 7. The output signal or the OR gate 30 is used as the load clock signal LDCK. Output signals of the AND gates 31, 32, 33, 34, 35, 36, 37 and 38 are supplied as the printing data to the printing portion 27.

Figure 4:
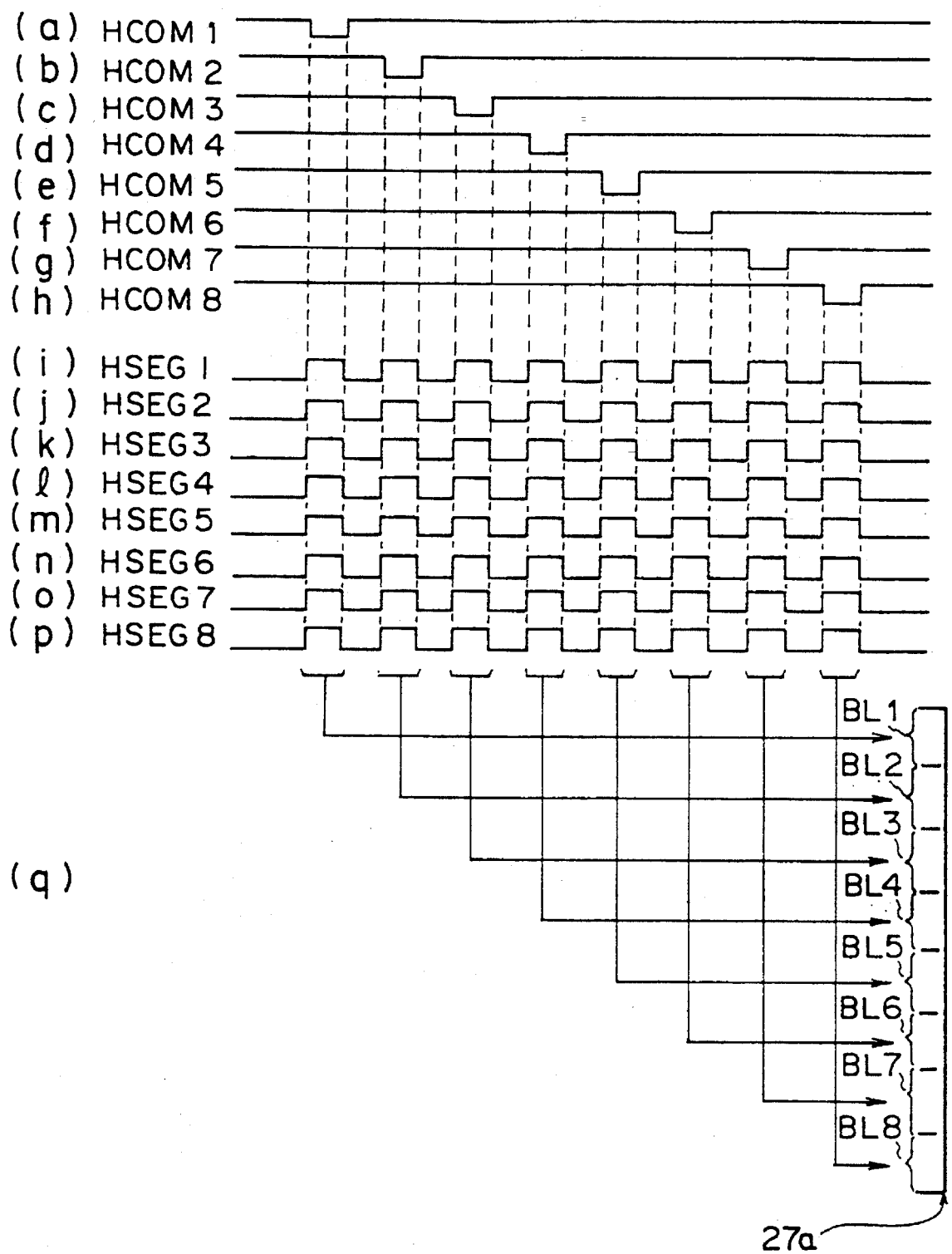
FIG. 4 is a timing chart illustrating a printing operation of a printing section of the printer unit shown in FIG. 2.

Here, in a case where a character is printed in which all dots are black, the recording controller 20 outputs printing data as shown in FIG. 4 (a) through (p) for one printing operation of the printing portion 27. That is, the signals HCOM1–HCOM8 are successively switched so as to be respectively set to the logical low level for a predetermined period of time. Due to the switching of the signals HCOM1–HCOM8, the blocks BL1, BL2, BL3, BL4, BL5, BL6, BL7 and BL8 are successively selected in the printing portion 27. During a state in which each of the blocks is selected, the signals HSEG1–HSEG8 are set to the logical high level corresponding to the black dot. As a result, all dots 27a in each of the blocks BL1, BL2, BL3, BL4, BL5, BL6, BL7 and BL8 are printed as black dots, as shown in FIG. 4 (q). That is, the printing portion 27 prints 64 black dots in one printing operation.

Figure 5:
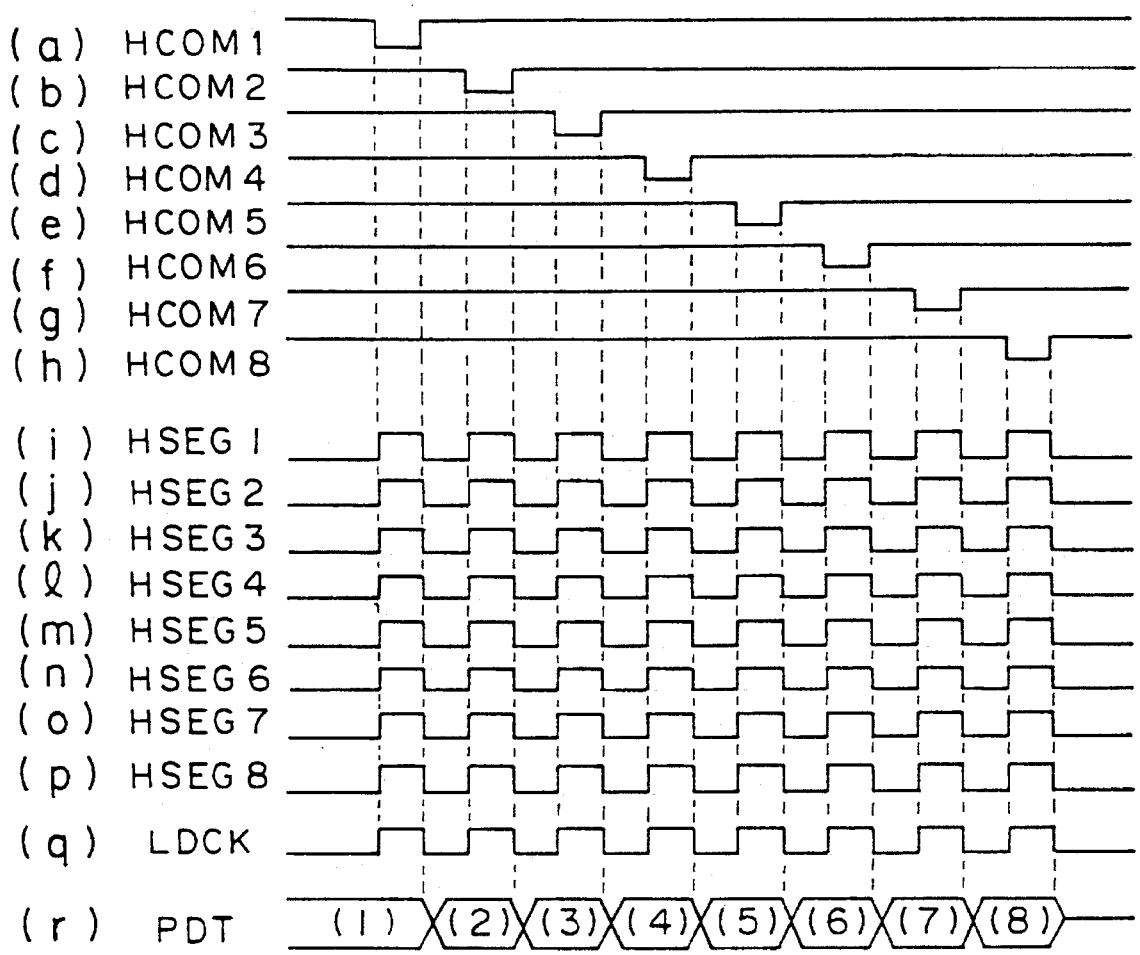
FIG. 5 is a timing chart illustrating an image recording operation performed in the printer unit shown in FIG. 2.

In a case where a character having only black dots is printed, every time one of the signals HCOM1–HCOM8 is activated (the logical low level), all the signals HSEG1–HSEG8 have the logical high level. Thus, every time one of the signals HCOM1–HCOM8 is activated, the AND gates 31, 32, 33, 34, 35, 36, 37 and 38 are opened. In addition, in the periods for which the signals HCOM1–HCOM8 are activated (the logical low level), the load clock signal LDCK has the logical high level when at least one of the signals HSEG1–HSEG8 has the logical high level, as shown in FIG. 5 (a) through (q). Every time the load clock signal LDCK becomes the logical low level, bits of the recording data PDT output from the printer interface circuit 7 are supplied to the AND gates 31, 32, 33, 34, 35, 36, 37 and 38. As a result, the printing data to be supplied to the printing portion 27 is changed from all black dots to dots indicated by the recording data PDT. That is, the recording data PDT is supplied to each of blocks BL1, BL2, BL3, BL4, BL5, BL6, BL7 and BL8 in the printing portion 27 via the AND gates 31, 32, 33, 34, 35, 36, 37 and 38, as shown in FIG. 5 (r).

Figure 6:
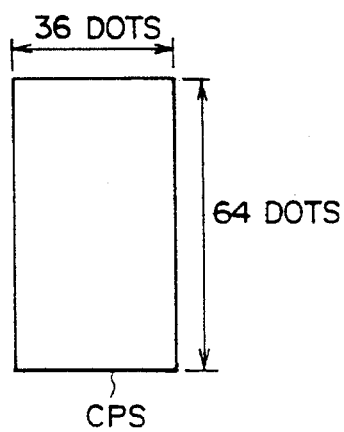
FIG. 6 is a diagram illustrating a character box.

When the printer unit 6 operates so that characters are printed, for example, at intervals of characters/inch, each character is formed by 36×64 dot matrix in which 36 dots are arranged in the main scanning direction and 64 dots are arranged in the sub scanning direction, as shown in FIG. 6. Thus, each character occupies a character box CPS, as shown in FIG. 6, having a height of 64 dots (corresponding to the width of the printing head) and a width of 36 dots. When the recording data PDT output operation is repeated 36 times, an image for one character box CPC is printed.

Figure 7:
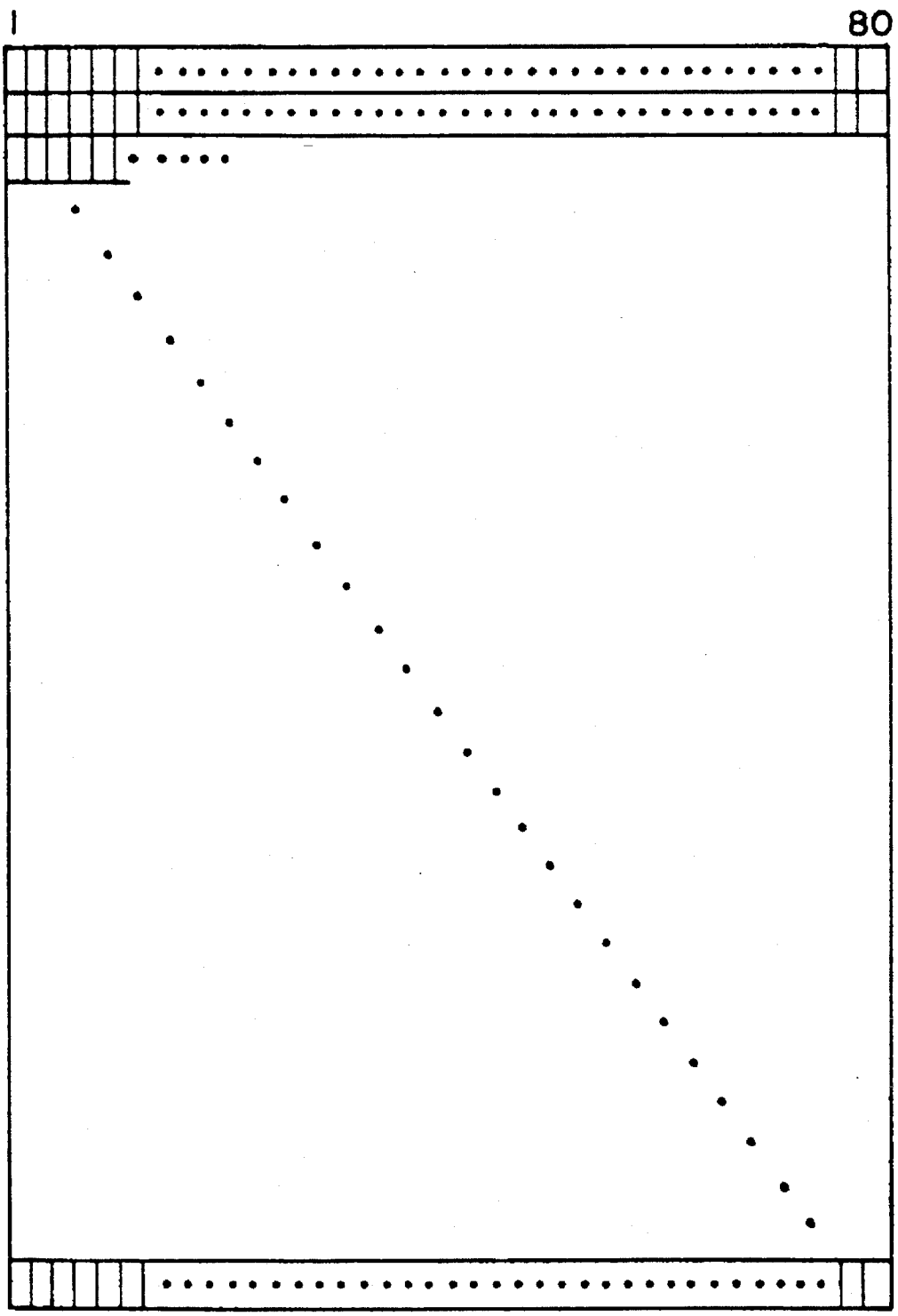
FIG. 7 is a diagram illustrating a printing operation of the printer unit for one page.

In the case where the printer unit 6 prints images at intervals of 10 characters/inch, the printing portion 27 has a printing width of 80 characters in the main scanning direction as shown in FIG. 7. Thus, the total number of dots in the main scanning direction is 2880.

Figure 8:
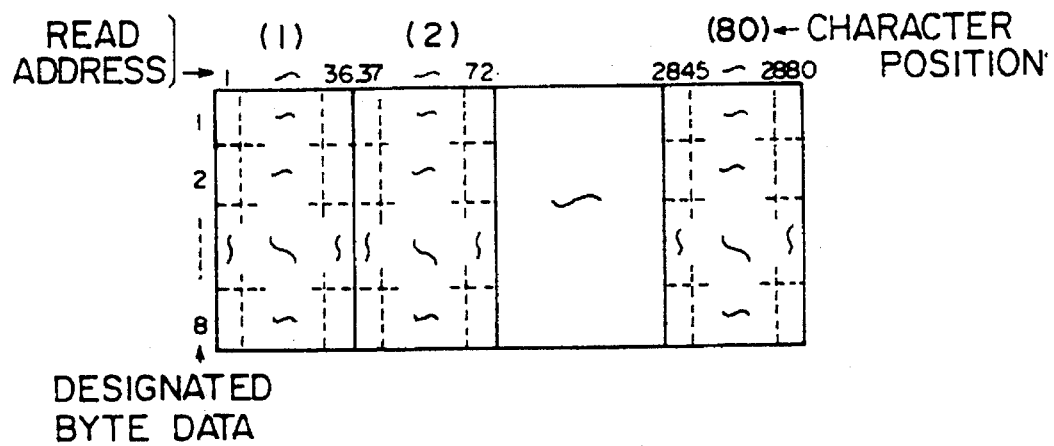
FIG. 8 is a diagram illustrating a buffer for recording data.

When a facsimile image received by the facsimile machine is printed out, the facsimile image is coded by the coder/decoder unit 10 line by line into image signals. The image signals are converted, by the image processing unit 11, into the recording data having the resolution appropriate for the printer unit 6. The recording data is temporarily stored in a recording data buffer as shown in FIG. 8. The recording data buffer is provided in the system memory 2 and has a storage capacity sufficient to store the amount of data for 64 lines, each line containing 2880 bits. The write operation is performed on the recording data buffer line by line in a direction in which the 2880 bits are arranged. The read operation uses a bit position in a direction in which the 2880 bits are arranged as an address. The 64 bits arranged, at a bit position corresponding to an address designated by the controller 1, in a direction perpendicular to each line are read out from the recording data buffer byte by byte (8 bits). The 8 bits (1 byte) read out from the recording data buffer are supplied as the above recording data PDT from the printer interface circuit 7 to the printer unit 6.

Figure 9:
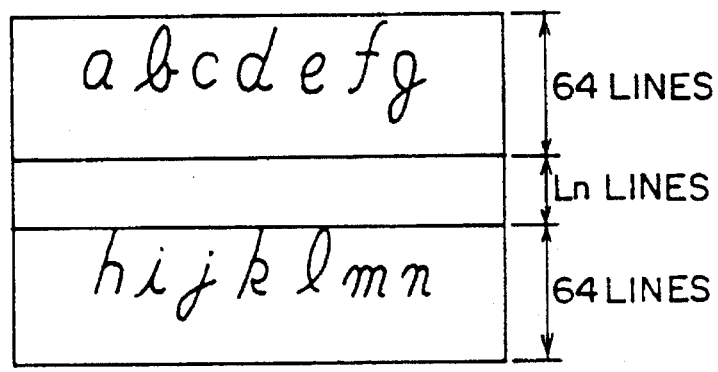
FIG. 9 is a diagram illustrating a recording skip operation in a sub scanning direction.

To decrease the printing time for one page, the operation of the carriage and the feeding of the recording sheet may be respectively skipped in the main scanning direction and in the sub scanning direction (a skip operation). In a skip operation in the sub scanning direction, when there are white lines, this is lines in which all the dots to be printed are white, between the end line in a printing area on which there are images to be printed and the next line containing at least one black dot, the recording sheet is fed so that an area corresponding to the number Ln of the white lines is skipped, as shown in FIG. 9. The printing operation is then performed on the next printing area having the line containing at least one black dot.

Figure 10:
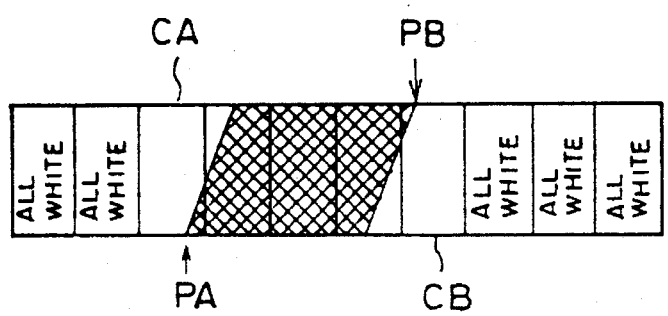
FIG. 10 is a diagram illustrating a recording skip operation in a main scanning direction.

In the skip operation in the main scanning direction, the leftmost side end PA of a black image included on a printing area on which an image is to be printed and the rightmost side end PB of the black image in the printing area are detected, as shown in FIG. 10. Only characters arranged between a character box CA containing the leftmost side end PA and a character box CB containing the rightmost side end PB are printed in the printing area. That is, the carriage skips over the side parts of the printing area in the main scanning direction.

Figure 11:
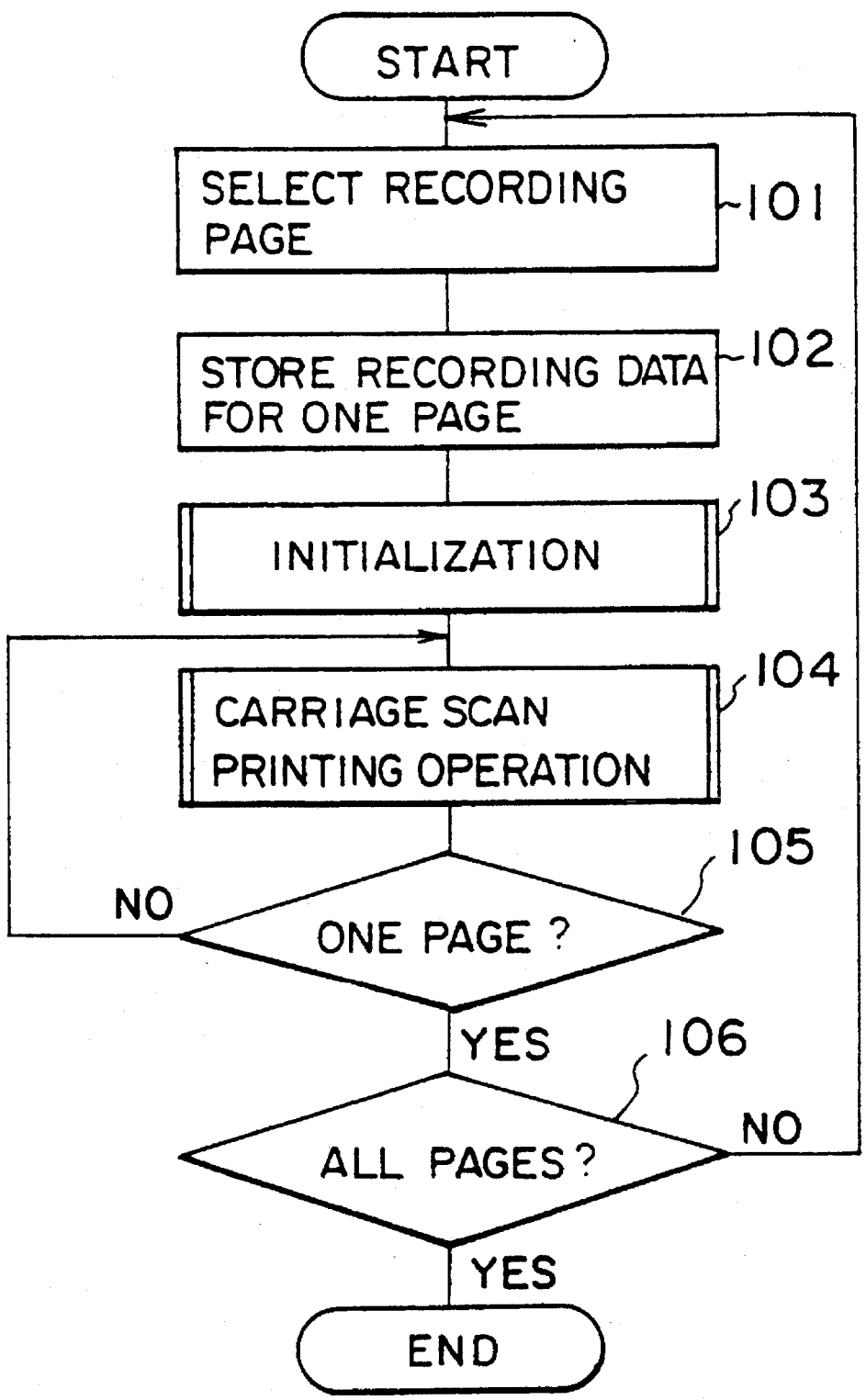
FIG. 11 is a flow chart illustrating a process for recording one document.

The controller 1 carries a process for outputting images of a facsimile document in accordance with a flow chart shown in FIG. 11.

After the controller 1 controls the switch circuit 5 so that the printer interface circuit 7 is selected, the process shown in FIG. 11 starts. Referring to FIG. 11, the controller 1 selects a page to be printed in step 101. In step 102, a facsimile image information for the selected page is decoded by the coder/decoder unit 10 so that a facsimile image signal corresponding to an original image is obtained, the resolution conversion of the facsimile image signal is performed, and so that recording data for the selected page to be printed by the printer unit 6 is stored in the system memory 2. In step 103, internal factors required for the printing operation for one page are cleared, and an initialization process (e.g. a setting process of the operation mode of the printer unit 6) is performed. After this, in step 104, a carriage scan printing operation is performed. In the carriage scan printing operation, while the carriage is being moved along a scanning direction, images are printed on the recording sheet. It is determined, in step 105, whether or not the printing of the image for one page has been completed. The carriage scan printing operation is repeated until the printing of the image for one page is completed on the recording sheet. After the printing operation for one page is completed, in step 106, it is determined whether or not the printing operation for all the pages of the facsimile document is completed. The above process in steps 101 through 106 are then repeated until the printing of the images for the last page of the facsimile document is completed on the recording sheet. When it is determined, in step 106, that the printing operation for all the pages of the facsimile document has been completed, the process ends.

Figure 12:
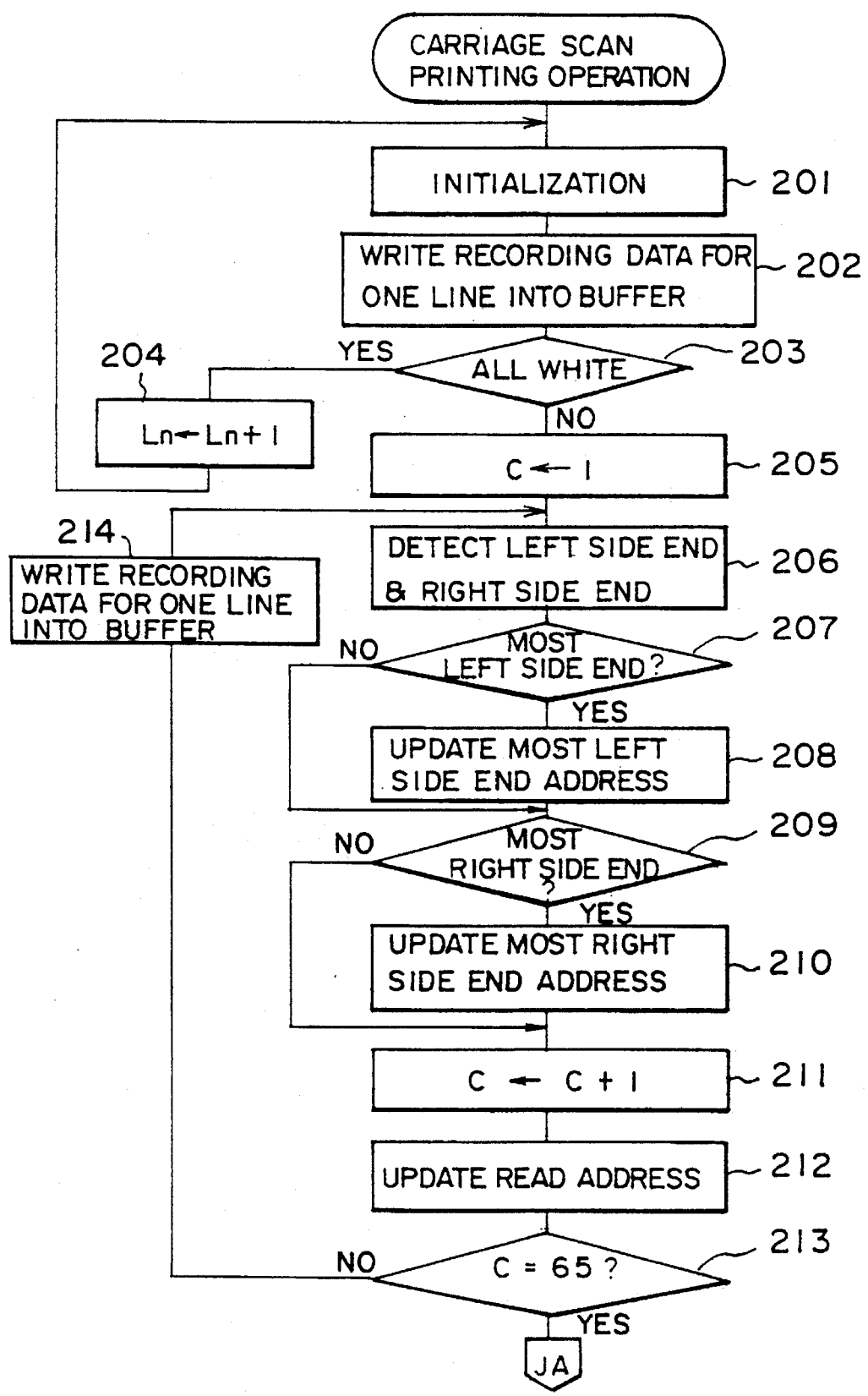
FIGS. 12, 13 and 14 are flow charts illustrating a process in which a carriage scans one recording line (a carriage one-scanning recording process).
Figure 13:
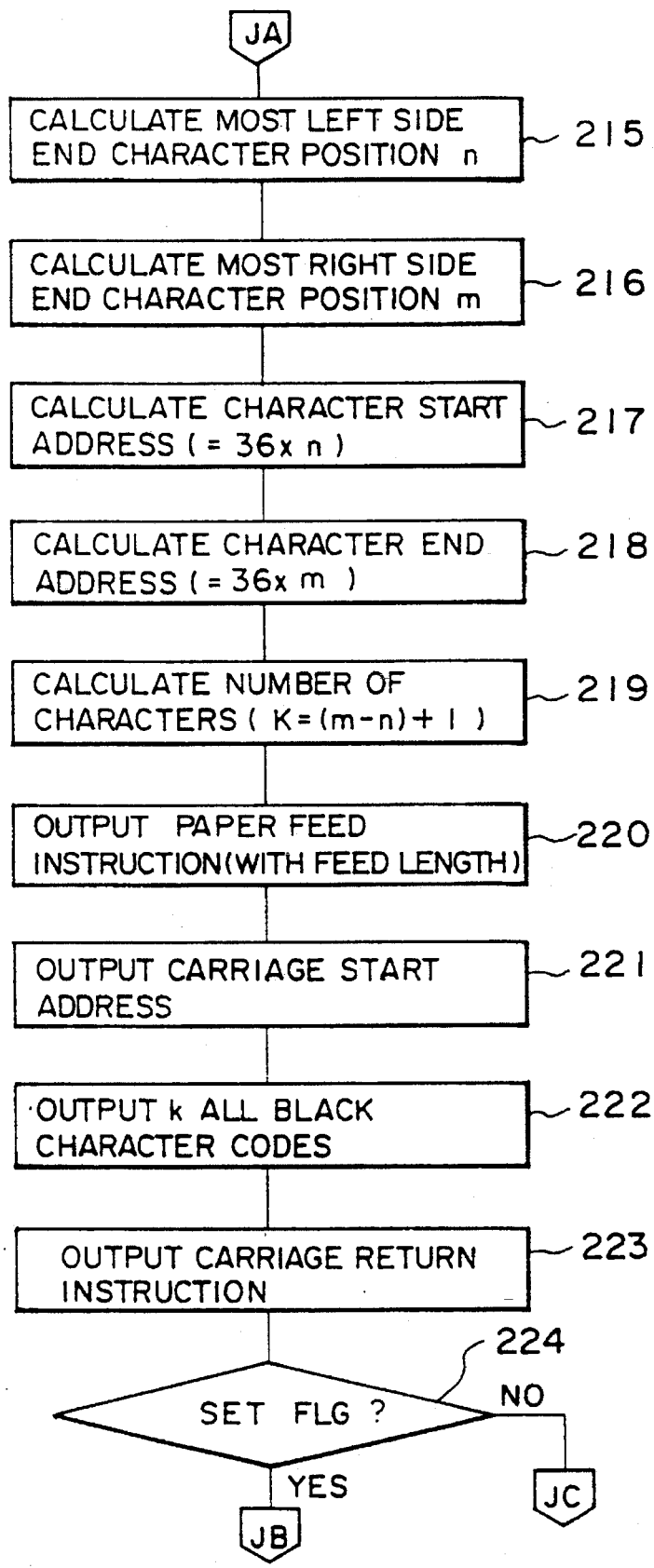
Figure 14:
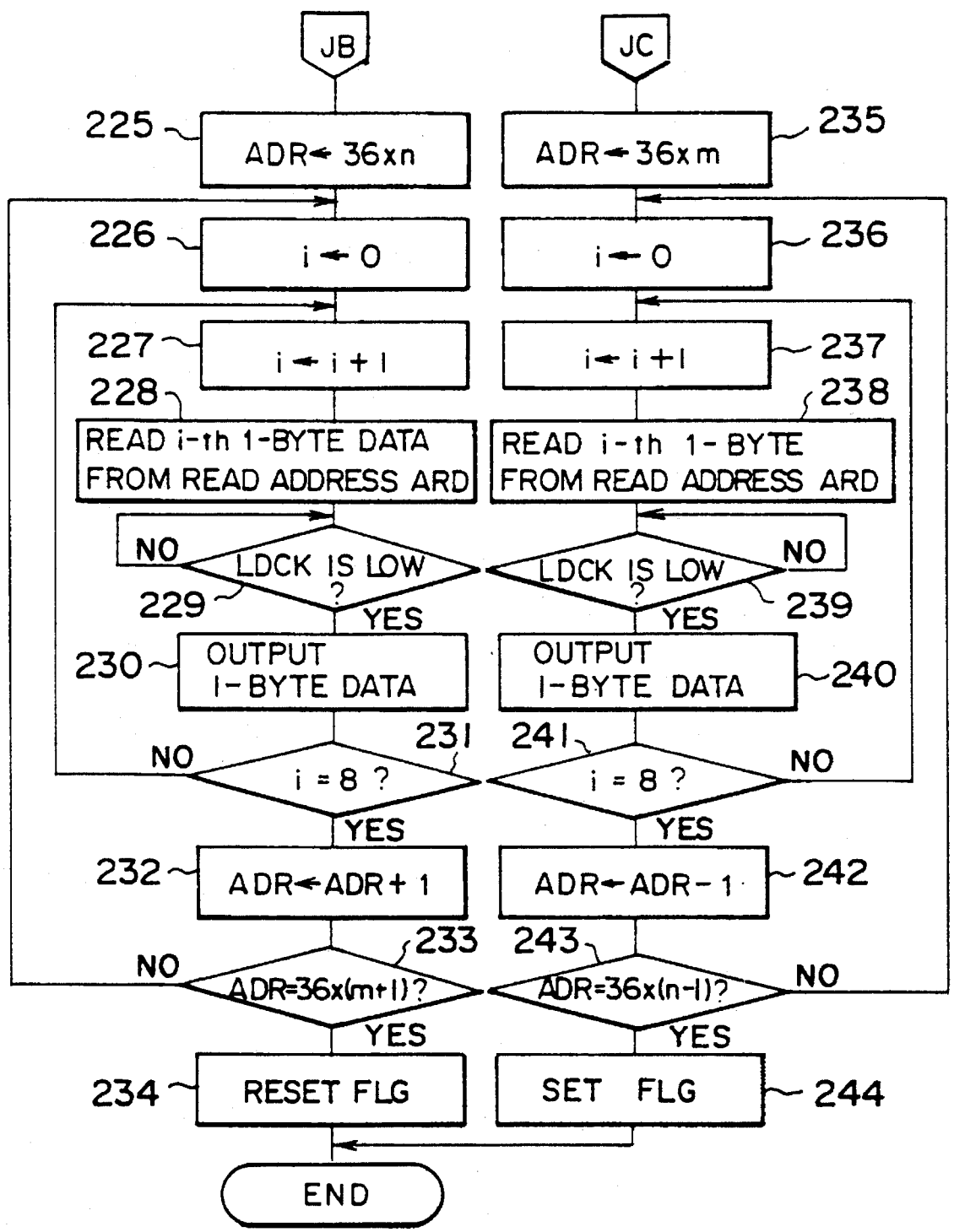

The carriage scan printing operation carried out in the above step 104 are shown in FIGS. 12, 13 and 14.

Referring to FIG. 12, in step 201, counters Ln, C and i used in the carriage scan printing operation, a flag FLG, variable numbers ADR and k, a leftmost side end address, a rightmost side end address and the like are initialized. In this initialization step 201, the respective counters Ln, C and i are set to "0", the flag FLG is set, the respective variable numbers ADR and k are set to "0", the leftmost side end address and the rightmost side end are respectively set to "2880" and "0". Recording data for the lead line is read out from the system memory 2 and is written in the lead line buffer of the recording data buffer, in step 202. In step 203, it is determined whether or not the lead line is the white line formed of only white dots. When the lead line is the white line, the counter Ln is incremented by one (Ln←Ln+1) in step 204 and the process returns to step 201. The recording data for the next line is written in the lead line of the recording data buffer again. On the other hand, when the lead line is not a white line, the counter C is set to "1" in step 205. Here, the preparation for reading recording data for 64 lines is performed. The count value of the counter Ln indicates the number of lines to be skipped in the skip operation in the sub scanning direction.

In step 206, a left side end address and a right side end address are detected from among the recording data for the line written most recently in the recording data buffer. A left end address and a right end address are detected from among the recording data of the line written in the recording data buffer most recently. The left side end address is defined as an address corresponding to a left end position at which a black dot is positioned in the line, the right side end address is defined as an address corresponding to a right end position at which a black dot is positioned in the line. After this, in step 207, it is determined whether or not the left side end address detected in step 206 is less than the leftmost side end address. When the left side end address detected in step 206 is less than the leftmost side end address, the left side end address detected in step 206 is defined as the leftmost side end address in step 208. That is, the leftmost side end address is updated. In step 209, it is determined whether or not the right side end address detected in step 206 is greater than the rightmost side end address. When the right side end address detected in step 206 is greater than the rightmost side end address, the right side end address detected in step 206 is defined as the rightmost sided end address in step 210. That is, the rightmost side end is updated. After this, in step 211, the counter C is incremented by one (C←C+1). An address of the recording data buffer at which buffer the recording data for one line is to be stored is updated in step 212. It is then determined, in step 213, whether or not the count value of the counter C has reached "65". When the count value of the counter C has not reached "65", the recording data for the next line is written in the recording data buffer in step 214, and the process returns to step 206. The process in steps 206 through 214 is repeated until the count value of the counter C reaches "65".

When the count value of the counter C reaches "65", the process proceeds to step 215 shown in FIG. 13. At this time, the recording data for 64 lines to be printed has been stored in the recording data buffer. Referring to FIG. 13, a leftmost side character position n at which the character box containing the leftmost side end address is positioned is calculated in step 215. A rightmost side character position m at which the character box containing the rightmost side end address is positioned is calculated in step 216. In step 215, the leftmost side end address is divided by 36 which is the number of dots to be arranged in the main scanning direction in the character box. An integer obtained by omitting a fractional part of the quotient is set as the leftmost side character position n. The rightmost side end address is divided by 36, and a fractional part of the quotient is omitted so that an integer is obtained. The rightmost side character position m is obtained by adding one to the obtained integer. Then, in step 217, the leftmost side character position n is multiplied by 36 so that a character start address is obtained indicating a left edge of a character positioned at a left end of a character string. In step 218, the rightmost side character position m is multiplied by 36 so that a character end address indicating a right edge of a character positioned at a right end of the character string. In step 219, the number k of characters which are scanned in one main scanning operation of the printing head is calculated in accordance with the following equation.

$$k=(m-n)+1$$

The controller 1 outputs a feed instruction for feeding the recording sheet, and outputs the feeding quantity by which the recording sheet is fed in step 220. Either the character start address or the character end address is output as a carriage start address, in step 221. Character codes indicating all black dots are output as the recording data in step 222, and a carriage return instruction is output in step 223. A state where the flag FLG is set to be active indicates that the carriage is to be moved from the left side to the right side in a scanning line. Thus, when the flag FLG is set to be in active, the character start address is output as the carriage start address. On the other hand, a state where the flag FLG is reset to be inactive indicates that the carriage is to be moved return from the right side to the left side along the scanning line. Thus, when the flag FLG is reset to be inactive, the character end address is output as the carriage start address.

According to the above process, in the printer unit 6, the recording sheet is fed in the sub scanning direction by a length corresponding to the feeding quantity designated by the controller 1, the carriage is moved to a position identified by the carriage start address, and k characters having only black dots are printed. After this, the carriage returns. In this case, as a double direction printing mode in which the printing operation is performed while the carriage is being moved and returning is set in the printer unit 6, the carriage stops at a position at which the printing operation ends. While the printer unit 6 is carrying out the printing operation, the load clock signal LDCK is output from the printer unit 6.

In the above state, the controller 1 determines whether or not the flag FLG is set to be active in step 224. When it is determined that the flag FLG is set to be active (YES) in step 224, the process proceeds to step 225 shown in FIG. 14. On the other hand, when it is determined that the flag FLG is reset to be inactive (NO) in step 224, the process proceeds to step 235 shown in FIG. 14.

In a case where the flag FLG is set to be active, in step 225, the read address ADR in the recording data buffer is set to a value (36×n) corresponding to the character start address n. The counter i used for designating a 1-byte data is initialized to "0" in step 226. The counter i is then incremented by one in step 227. The i-th 1-byte data in 8 byte data designated by the read address ADR is read out from the recording data buffer in step 228. The controller waits until the load clock signal LDCK becomes the logical low level in step 229. When it is detected that the load clock signal LDCK has become the logical low level, the i-th 1-byte data read out from the recording data buffer is supplied as the recording data PDT to the printer unit 6 in step 230. In step 231, the controller 1 determines whether or not the count value of the counter i has reached "8". If the count value has not reached "8" the counter i is incremented by one again, the next 1-byte data is supplied as the recording data PDT to the printer unit 6. Then the process in steps 227 through 231 is repeated until the count value of the counter i reaches "8".

When the counter i reaches "8", the process proceeds from step 231 to step 232. In step 232, the read address ADR is incremented by one (ADR← ADR+1). It is then determined whether or not the updated read address ADR corresponds to a position obtained by adding 1 to the character end position m, in step 233. When the read address ADR does not correspond to the above position, the counter i is initialized to "0" and the reading process for the updated read address ADR is performed. The above process in steps 226 through 233 is repeated until the updated read address corresponds to the position obtained by adding 1 to the character end position m. On the other hand, when the updated read address ADR corresponds to the position obtained by adding 1 to the character end address m, the process proceeds from the step 233 to step 234. In step 234, the flag FLG is reset to be inactive. That is, the carriage scan printing operation in which the carriage scans one line is completed.

On the other hand, in a case where the flag FLG is reset to be inactive, the carriage is to be moved from the right side to the left side in the contrast with the above case. In this case, in step 235, the read address ADR is set to a value (36×m) corresponding to the character end address m. In step 236, the counter i is initialized to "0" and in step 237, the count value of the counter i is incremented by one. The i-th 1-byte data in 8 byte data designated by the read address ADR is read out from the recording data buffer in step 238. After this, the controller 1 is waiting until it is detected that the load clock signal LDCK becomes the logical low level in step 239. When it is detected that the load clock signal LDCK becomes the logical low level, the 1-byte data read out from the recording buffer is supplied as the recording data PDT to the printer unit 6 in step 240. After recording data PDT (the 1-byte data) is supplied to the printer unit 6, the controller 1 determines whether or not the counter i has reached "8". When the counter has not reached "8", the counter i isincremented by one again, and the next 1-byte data is
    supplied as the recording data PDT to the printer unit 6. The process in steps 237 through 241 is repeated until the count value of the counter i reaches "8". When the count value of the counter i reaches "8", the process proceeds from step 241 tostep 242. In step 242, the read address ADR is decremented by one in step 242. It is then determined, in step 243, whether or not the updated read address ADR corresponds to a position obtained by subtracting 1 from the character start position n. When the updated read address ADR does not correspond to the above position, the counter is initialized to "0" and the reading process for the updated read address ADR is performed. The above process in steps 236 through 243 is repeated until the updated read address corresponds to the position obtained by subtracting 1 from the character start position n. On the other hand, when the updated read address ADR corresponds to the position obtained by subtracting 1 from the character start address n, the process proceeds from the step 243 to step 244. In step 244, the flag FLG is set to be active. That is, the carriage scan printing operation in which the carriage scans is caused to return is completed.

In the above embodiment, the recording image data is printed out by the printer unit 6 in the character printing mode in which characters are printed out. Thus, the time required for printing out an image for one page can be reduced. In addition, the printing operation in the printer unit 6 is performed using the skip operation of the carriage in the double direction printing mode. Thus, the printing speed can be further improved.

When an external printer mode instruction is input to the operation/display unit 9, the controller 1 controls the switching circuit 5 so that the external connector 8 is selected. In this state, as the printer unit 6 is busy, the image data received by this facsimile machine can not printed out by the printer unit 6. Thus, the received image data is temporarily stored in either the system memory 2 or the image storage unit 12. A message that the printer is being used is indicated in the operation/display unit 9. When the external printer mode is released by the user, the image data stored in the memory is supplied as the recording data PDT to the printer unit 6 in the manner as described above.

Figure 15:
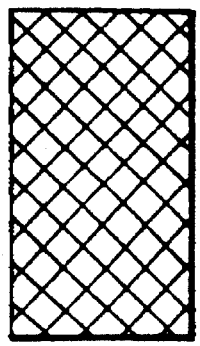
FIG. 15 is a diagram illustrating font data for a character having only black dots.

In the above embodiment, the image data is printed out by the printer unit 6 using a font data having only black dots. This font data is referred to as an all black font data. The all black font data is provided in the font memory 23 of the printer unit 6. The all black font data as shown in FIG. 15 may be supplied from an external unit to the printer 6. The all black font data is loaded into the printer unit 6 in accordance with a flow chart shown in FIG. 16. The process shown in FIG. 16 is performed in accordance with instructions from the controller 1 when the facsimile machine is activated.

Figure 16:
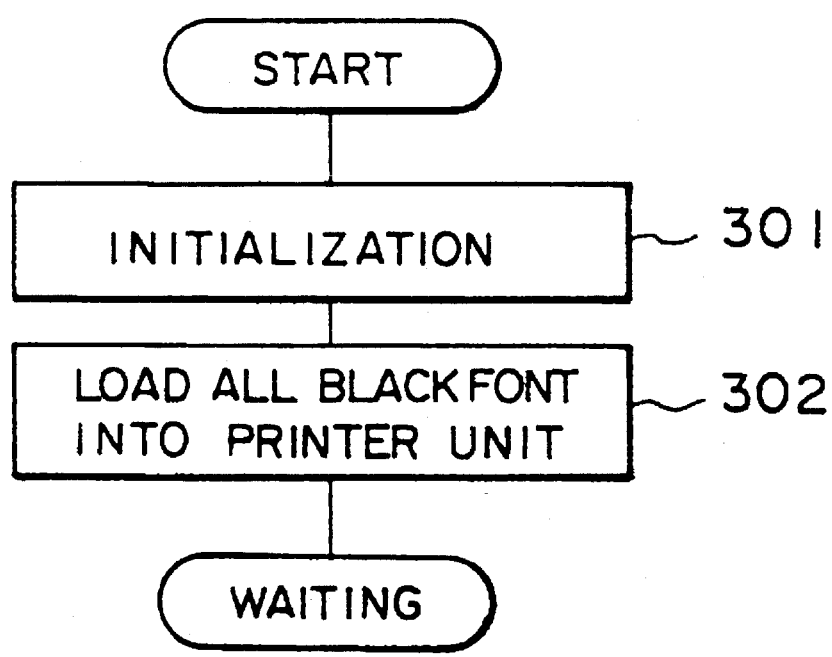
FIG. 16 is a flow chart illustrating an example of a start operation.

Referring to FIG. 16, the controller 1 initializes various parts of the facsimile machine in step 301. After this, the all black font data is loaded along with a code identifying the all black font data into the printer unit 6 via the printer interface 7 using an external character loading function of the centronics interface in step 302. When the all black font data is accessed by the code in the facsimile machine.

Figure 17:
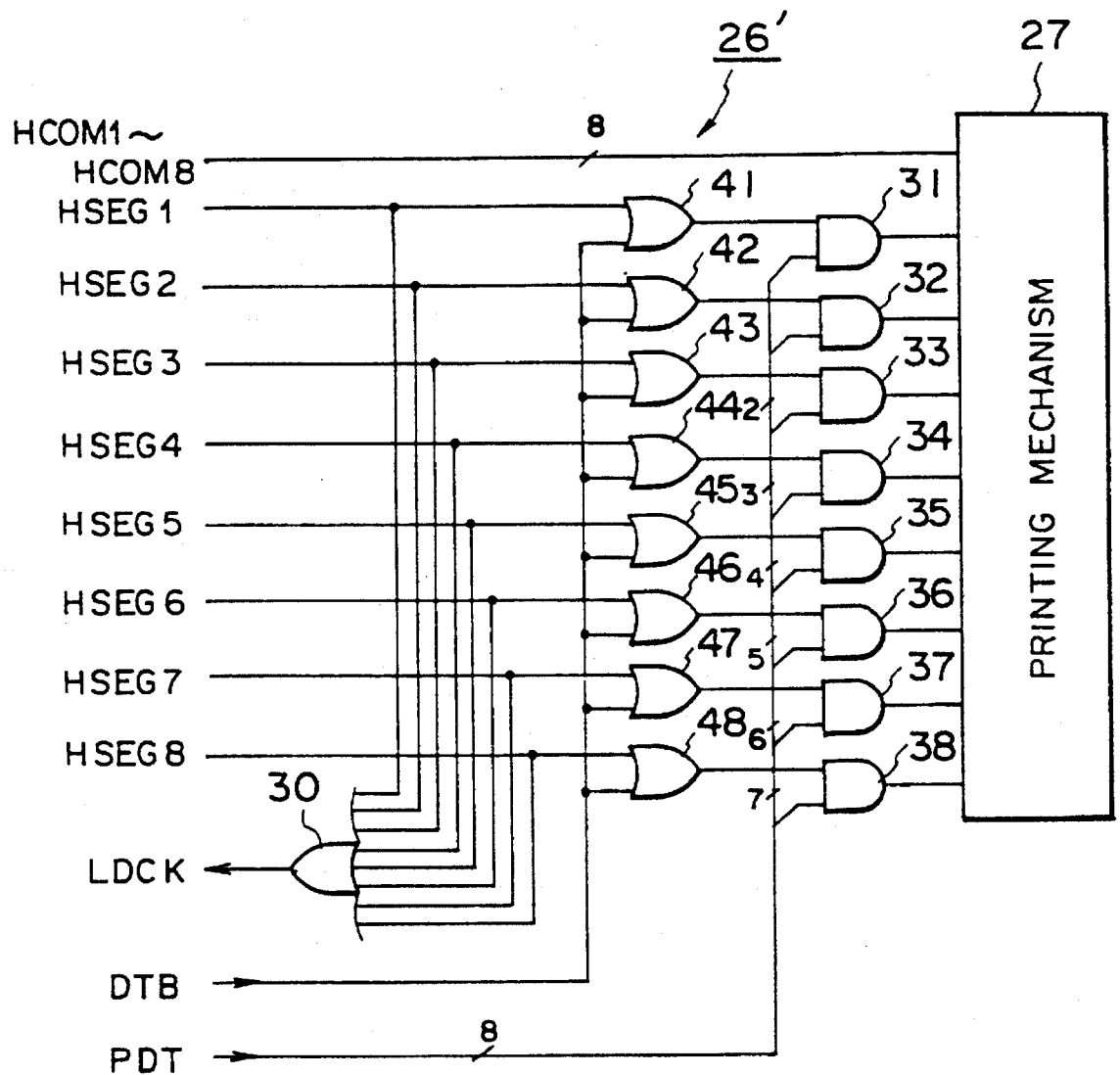
FIG. 17 is a circuit diagram illustrating another example of the gate circuit in the printer unit.

In a case where the printer unit 6 has no external character loading function, the gate circuit 26' provided in the printer unit 6 is formed as shown in FIG. 17. In FIG. 17, those parts which are the same those shown in FIG. 3 are given the same reference numbers.

Referring to FIG. 17, the signals HSEG1–HSEG8 are supplied to the input terminals of the OR gate 30 and to input terminals of respective OR gates 41, 42, 43, 44, 45, 46, 47 and 48. The all black font data DTB is input to other input terminals of the OR gates 41, 42, 43, 44, 45, 46, 47 and 48. Output signals of the OR gates 41, 42, 43, 44, 45, 46, 47 and 48 are respectively supplied to input terminals of the AND gates 31, 32, 33, 34, 35, 36, 37 and 38. Thus, when the all black font data is active (the logical high level), the output signals of the OR gates 41, 42, 43, 44, 45, 46, 47 and 48 are always open. Thus, the printing data PDT from the printer interface circuit 7 is supplied to the printing portion 27 in the same manner as in the case shown in FIG. 3.

In this case, when the facsimile image is printed out, a character code identifying a character in which at least one black dot is in each line must be supplied to the printer unit 6. The present invention is not limited to the aforementioned embodiments, and variations and modifications may be made without departing from the scope of the claimed invention.

What is claimed is:

1. A facsimile machine comprising:

a printer unit for printing out data having a predetermined format; and interface means, coupled to said printer unit, for converting facsimile image data into recording data having a format in which said printer unit can input the recording data, and for supplying the recording data to said printer unit, wherein said printer unit comprises:

a printing portion for printing recording data; and data supply control means, coupled to said interface means and said printer portion, for supplying the recording data from said interface means to said printing portion at predetermined printing intervals.

2. The facsimile machine as claimed in claim 1, wherein said printer unit and said interface means are coupled to each other based on a centronics interface specification.

3. The facsimile machine as claimed in claim 1, wherein said data supply control means comprises:

input means for inputting a predetermined character data at the predetermined printing intervals;

gate means for gating the recording data from said interface means so that the recording data is supplied to said printing portion when the predetermined character data is supplied thereto from said input means; and signal output means for outputting a control signal when said input means inputs the predetermined character data, the control signal being supplied to said interface means, and said interface means supplying the recording data to said printer unit every time said interface means receives the control signal.

4. The facsimile machine as claimed in claim 3, wherein the predetermined character data indicates a font having only black dots.

5. The facsimile machine as claimed in claim 4, wherein said gate means has AND gates to each of which a corresponding one of bits of said predetermined character data and a corresponding one of bits of said recording data from said interface means are input.

6. The facsimile means as claimed in claim 1, further comprising:

a connector connected to said printer unit, through which connector recording data is supplied from an external unit to said printer unit; and selecting means, coupled to said connector and said interface means, for selecting either a connection between said interface means and said printer unit or a connection between said connector and said printer unit.

7. The facsimile machine as claimed in claim 3, wherein said interface means has loading means for loading the predetermined character data into said printer unit.

8. The facsimile machine as claimed in claim 7, wherein said loading means loads the predetermined character data into said printer unit when said printer unit is activated.

9. The facsimile machine as claimed in claim 3, wherein said input means has converting means for converting the predetermined character data into black data indicating a font having only black dots, and wherein when the black data is supplied to said gate means, the recording data from said interface means is supplied to said printing portion via said gate means.

10. The facsimile machine as claimed in claim 9, wherein said converting means has OR gates to each of which a corresponding one of the bits of the predetermined character data and a bit indicating a black dot are input.

* * * * *